3,608,430
METHODS FOR FORMING AIRCRAFT REDUNDANT CONTROL SYSTEMS AND SYSTEMS FOR CARRYING OUT THE METHODS
John P. Headlund, Bellevue, and Odd Justad, Issaquah, Wash., assignors to The Boeing Company, Seattle, Wash.
Filed June 29, 1970, Ser. No. 50,616
Int. Cl. F01b 25/00; F15b 11/16
U.S. Cl. 91—1                                           18 Claims

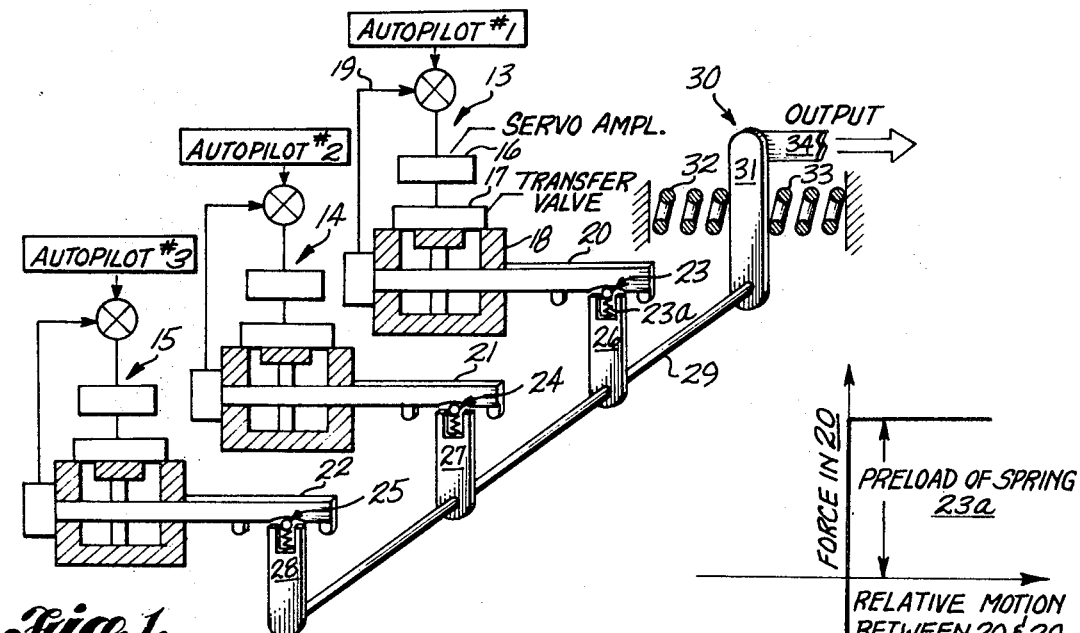
Fig. 1.
Fig. 4.
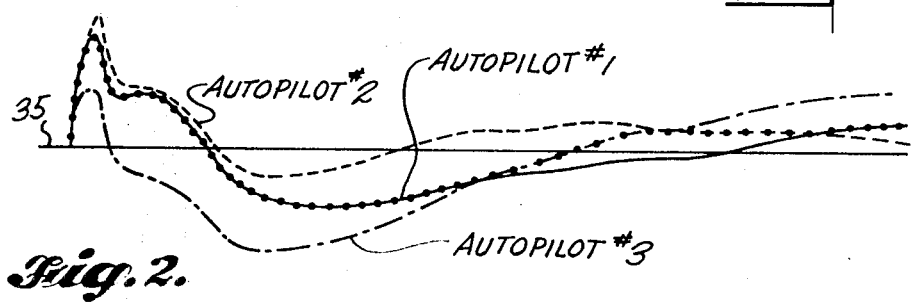
Fig. 2.
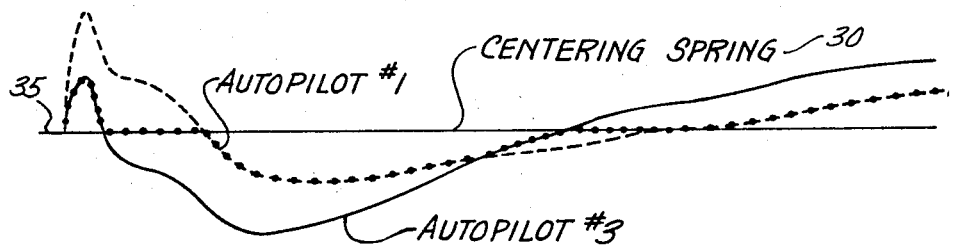
Fig. 3.
INVENTOR.
JOHN P. HEADLUND
ODD JUSTAD
BY
AGENT United States Patent Office 3,608,430
Patented Sept. 28, 1971

ABSTRACT OF THE DISCLOSURE

Methods for forming dual and triple redundant control systems and systems for carrying out the methods are disclosed. The dual and triple redundant control systems, such as, but not limited to airplane autopilot control systems are set forth for mechanically combining the command outputs of the two or three independent autopilots and their servo units and detent connections between the servo units and a system output for providing an output signal representative of the mid-valued output between the other two outputs or between the other output and neutral. These systems are entirely mechanical, utilizing two or three spring loaded detents and a spring centering device.

BACKGROUND OF THE INVENTION

Field of the invention

This invention appears to be classified in Class 244 (Aeronautics), Subclass 75 (Devices and arrangements directed to and limited to the controlling of aircraft in flight).

SUMMARY OF THE INVENTION

In the process of considering airplane operation to lower altiude minimums, the probability of success is enhanced if an autopilot control system was available that continues to command correct surface deflection after a failure has occurred anywherein the system. Two methods for forming two automatic control systems for carrying out the two methods are described herein which meet this failure requirement. One system utilizing three independent control systems, such as autopilots and related servos with the three outputs passing through three detents to a spring centering device, the system or final output of which is equal to or at least proportional to the mid-valued autopilot output between the other two autopilot outputs.

A second auomatic control system described herein for carrying out a method requires only two independent control systems, such as autopilots where the system output is equal to or at least proportional to the mid-valued output of the three outputs of a single spring centering device and the two autopilots.

Thus, a principal object of this invention is to provide two methods for forming two reliable, safe, an dependable control systems.

Accordingly, a primary object of this invention is to provide a very reliable control system utilizing three control command outputs wherein upon the failure of one output, the system output is equal to or at least proportional to the mid-valued command output between the three outputs.

Another primary object of this invention is, to provide a second very reliable control system utilizing only two control command outputs and a spring centering output wherein upon failure of one command output, the system output is proportional to the mid-valued output between the two outputs and the spring centering output.

Another object of this invention is to provide a system which does not rely on failure detection of the first failure and subsequent action to be safe.

A further object is to provide a very reliable and safe aircraft control system comprising either two autopilots and a spring centering device or three autopilots, all generating outputs, wherein upon the failure of an autopilot the system output is proportional to the mid-valued output of the three outputs in the system.

Still another object of this invention is to provide voting for the autopilot servo actuator output of three autopilots having the mid-valued output between the three autopilot outputs.

A still further object of this invention is to provide a reliable, redundant, mechanical, control system for a multiplicity of autopilots which possesses a minimum of system complexity and without the dependence upon electronics for controlling a system failure.

Other objects and various advantages of the disclosed aircraft dual and triple redundant control system will be apparent from the following detailed description, together with the accompanying drawings, submitted for purposes of illustration only and not intended to define the scope of the invention, reference being made for that purpose to the subjoined claims.

BRIEF DESCRIPTION OF DRAWINGS

The drawings diagrammatically illustrate by way of example, not by way of limitation, two methods and two forms of the invention wherein like reference numerals designate corresponding parts in the several views in which:

FIG. 1 comprises a schematic drawing of the control system in which an autopilot may fail and the system still generates a valid output signal;

FIG. 2 is a typical response of three varying independent autopilots of the system of FIG. 1 illustrating that the mid-valued output is selected;

FIG. 3 is a typical response after one of the autopilots has failed and has been disconnected with the remaining two varying independent autopilots and the spring centering device illustrating that the mid-valued output is then selected; and FIG. 4 illustrates the ideal characteristics of the detents.

DESCRIPTION OF THE PREFERRED EMBODIMENTS

The invention, the scope of which being defined in the appended claims, is not limited in its application to the details of construction and arrangement of parts shown and described, since the invention is capable of other embodiments and of being practiced or carried out in various other ways. Also, it is to be understood that the phraseology or terminology employed herein is for the purpose of description and not of limitation.

While the disclosed invention may be used as any highly reliable and safe control system, it is illustrated and disclosed herein as applied to the control system of an aircraft.

TRIPLE REDUNDANT CONTROL SYSTEM

FIG. 1 illustrates a new aircraft control system which would carry out one of the new methods for forming a triple redundant control system, the system comprising three command signal generators or autopilots 1, 2, and 3 for transmitting command signals to servo motors such as the electrohydraulic actuators 13, 14, and 15, respectively. The disclosed servo motor 13, for example, comprises a servo amplifier 16, transfer or electrohydraulic servo valve 17, hydraulic actuator 18, position feedback 19, and actuating arm 20 movable in proportion to the command signal from the autopilot 10.

Electrohydraulic actuators 14 and 15, FIG. 1, likewise have actuating arms 21 and 22, respectively. Detents 23, 24, and 25 which have force-displacement characteristics as shown in FIG. 4, yieldably connect the respective arms 20, 21, and 22 to levers 26, 27, and 28 which are rigidly connected to system output shaft 29.

Referring to detent 23 in FIG. 1, a spring 23a and ball of the detent lock the lever 26 to the output actuator arm 20 with a force equal to the preload in spring 23a as illustrated in FIG. 4. If the force exerted externally at the output 29, FIG. 1, is greater than the preload of the spring 23a, the detent 23 collapses and the output is no longer proportional to the actuating arm motion. There is then relative motion between actuating arm 20 and output 29 as shown in FIG. 4. If the force exerted externally at the output 29 is less than the preload of spring 23a, lever 26 will lock the output 29 to the actuating arm 20 and there will be no relative motion between actuating arm 20 and the output 29, as illustrated in FIG. 4.

A centering device 30 comprises arm 31 rigidly mounted on system output shaft 29 and centering springs 32 and 33, and an output link 34, the centering springs 32, 33 being overrideable by either one of the detents 23, 24, or 25.

As seen from FIG. 1, each of the three independent autopilots 1, 2 and 3 transmits its command signal to its respective electrohydraulic actuators 13, 14, and 15, which in turn positions its actuating arms 20, 21, and 22, respectively, proportional to its command signal. These independent actuating arms 20, 21, and 22 transmit their position to the system output shaft 29 through their mechanical detents 23, 24, and 25 and detent lever arms 26, 27, and 28. With spring centering means 30 always providing its input on the shaft 29, system output shaft 29 thereby generates the system output signal through arm 31 and ouput link 34.

FIG. 2 illustrates the operation or typical response of the triple redundant control system of FIG. 1. Line 35 is the reference output to which the centering device 30 tends to return the system output to at all times and to which each actuator positions the system output for zero autopilot commands. The solid line #1 represents the command output of autopilot 1, the broken line #2 represents the command output of autopilot 2, and the dash-dot line #3 represents the command output of autopilot 3.

If the command signals of the three control systems are not identical, the detent forces from the high and low command output oppose each other and the actuator arms receiving these two command outputs will be "out of detent," or will exhibt relative motion between actuating arm and output while the actuator arm receiving the mid-valued command signal will be "in detent" and will exert a force overpowering the centering device to provide an output signal to the shaft 29 which in turn accordingly generates the system output signal equal to or at least proportional to the mid-valued command signal, depending upon the compliance of the detent and of the shaft and linkage.

Thus, as seen in FIG. 2, at the far left side, all three output curves of the three independent signal generators 1, 2, and 3 are initially equal to each other and control the system output signal. Then as each of the three command output signals vary from each other, FIG. 2 illustrates that the three detents continuously "vote" for the mid-valued command output signal and cause the shaft 29 to generate a system output signal equal to the mid-valued command output signal as indicated by the row of circles always on the mid-valued signal as all signals vary relatively to each other.

The system output will be equal to the mid-valued command provided the arms, linkages, and shafts, including the detent, have infinite stiffness. In the practical case when arms, linkages, shafts, and detents do not have infinite stiffness, the system output will be proportional to the mid-valued command.

In an averaging system where if #3 output curve dropped through the bottom of the chart, the average curve and system output would go very low likewise, while in the mid-value system, if curve #3 dropped out of sight, indicating a failed signal generator, the system output curve #2 would not be affected. Thus, either of the outside curves may indicate a failed command signal generator with the system output always coming from the correct signal or mid-valued signal.

DUAL REDUNDANT CONTROL SYSTEM

FIG. 3 illustrates the response of a second control system which would carry out another one of the new methods for forming a dual redundant control system like the system of FIG. 1 after one of the three independent command signal generators 1, 2, or 3 has become inoperative and disconnected and the system has become a dual redundant control system.

With only autopilots #1 and #3, operative in the control system of FIG. 1, for example, the resultant dual redundant control system has an output as typified by FIG. 3. Here, the centering device which tends to return the system output to the neutral or reference position becomes effective in conjunction with the outputs of the two autopilots to maintain the system output equal to the referenced output when the two autopilot actuating arms 20 and 22 are of opposite polarity with respect to the referenced output or equal to or proportional to the least value output of the two autopilots' output actuating arms when their arms are of the same polarity with respect to the referenced output. Thus, the output is proportional to the mid-valued output of the three outputs. The maximum force level from the centering device must be lower than the maximum force output of each of the detents so that the output signals from the three will result in the mid-valued voting operation. Thus, while the broken line #1, FIG. 3, represents the command output of signal generator #1, the solid line #3 represents the command output of signal generators #3, and the straight line 35 represents the neutral position to which the spring centering device 30 is always urging the final or system output towards when not overridden by one of the command generators. Accordingly, the circled line represents the mid-valued system output as "voted" by the three signals comprising the output of the two signal generators and the centering device.

Accordingly, in case of failure of one of the two command signal generators, the system output will either follow the good signal generator or return to neutral as illustrated in FIG. 3. Thus, voting is provided for the mid-valued system output.

Thus voting is provided for by a control system between the outputs of three command signal generators for a system output proportional to the mid-valued output. Also, voting is provided by the same control system between the outputs of two signal generators and a spring centering device for a system output proportional to the mid-valued output.

Likewise, to meet failure prevention and reliability requirements, voting for the mid-valued autopilot output is accomplished with a reliable mechanical control system without the dependence upon electronics for controlling system failures.

Further, no electronics cross-comparison of autopilot systems is required as the autopilot systems are completely independent and failure detection for each of the three systems is completely separated.

Likewise, sensitivity of the control system may be set at any desired level depending on autopilot tolerances, etc., whereby nuisance disagreements are minimized.

In addition, the outputs of the several autopilot electrohydraulic actuators are not limited to a narrow band width since only the mid-valued output is utilized to provide the final output signal.

Also, this control system is tolerant of large differences in autopilots or command signal generators.

Further, the disclosed control system for a multiplicity of autopilots possesses a minimum system complexity.

And further, dual and single channel autopilot operational requirements are met by the instant control system.

Thus, it will be seen that the presently disclosed control systems provide both methods for forming dual and a triple redundant control system, and the systems for carrying out the methods in a manner which meets each of the objects set forth above.

Having specifically described our invention, we do not desire to confine ourselves to the specific details of the constructional example herein shown and described as it is apparent that various modifications may be resorted to without departing from the broad principles of the invention as indicated by the scope of the following claims.

We claim:

1. A method for forming a reliable control system comprising:
    (a) generating a signal from each of three signal generators and a centering means,
    (b) canceling with detent means the two signals having values farthest apart of any three of said four generated signals, and
    (c) generating a system output signal proportional to the mid-valued signal between the two canceled signals.

2. A method as recited in claim 1 wherein the second step comprises:
    (a) canceling the two signals having values farthest apart of the three signals of said signal generators.

3. A method as recited in claim 1 wherein the first step comprises:
    (a) generating signals from only two of said signal generators, and
    (b) passing said latter two generated signals through detent means and adding thereto said signal from said spring centering means.

4. A redundant control system comprising:
    (a) a plurality of signal generator means, each of said signal generator means generates a signal, one of said signals being a mid-valued signal between the other signals,
    (b) system output means,
    (c) detent means for said system output means, and
    (d) said system output means being responsive to said detent means for generating an output signal proportional to said one mid-valued signal.

5. A redundant control system as recited in claim 4 wherein:
    (a) said system output means has a centering means, and
    (b) said system output means is responsive to both said detent means and said centering means for generating an output signal proportional to said mid-valued signal.

6. A redundant control system as recited in claim 4 wherein:
    (a) said plurality of signal generator means comprises three signal generator means and a spring centering means, and
    (b) said system output means being responsive to said three signal generator means and said detent means for generating an output signal proportional to said one mid-valued signal.

7. A redundant control system as recited in claim 4 wherein:
    (a) said plurality of signal generator means comprises two signal generator means and a spring centering signal generating means, and
    (b) said system output means is responsive to said two signal generator means and said spring centering signal generating means for generating an output signal proportional to said one mid-valued sinal.

8. A triple redundant control system comprising:
    (a) three signal generators means, each of said signal generator means generates a signal, one of said signals being a mid-valued signal between the other two signals,
    (b) system output means,
    (c) detent means for said system output means, and
    (d) said system output means being responsive to said detent means for generating an output signal proportional to said one mid-valued signal.

9. A triple redundant control system as recited in claim 8 wherein:
    (a) said system output means has a spring centering means, and
    (b) said system output means is responsive to said detent means and said spring centering means for generating an output signal proportional to said mid-valued signal.

10. A redundant control system as recited in claim 9 wherein:
    (a) said system output means is responsive to said three signal generator means and said spring centering means for generating an output signal proportional to said mid-valued signal.

11. A redundant control system as recited in claim 8 wherein:
    (a) one of said three signal generator means is a spring centering means, and
    (b) said system output means being responsive to said spring centering means and said other two signal generator means for generating an output signal proportional to said one mid-valued signal.

12. An aircraft triple redundant control system comprising:
    (a) three autopilot signal generating means for generating three separate and independent command signals, one of said signals having a mid-value relative to the other two signals,
    (b) signal output means,
    (c) detent means for connecting said three autopilot signal generating means to said signal output means, and
    (d) said signal output means being responsive to said detent means for generating an output signal proportional to said one mid-valued signal.

13. An aircraft redundant control system as recited in claim 12 wherein:
    (a) one of said autopilot signal generating means comprises an electrohydraulic actuator driven by an autopilot for generating said plurality of independent signals.

14. An aircraft triple redundant control system as recited in claim 12 wherein:
    (a) said signal output means has a centering means, and
    (b) said signal output means is responsive to said detent means and said centering means for generating said output signal proportional to said one mid-valued signal.

15. An aircraft redundant control system as recited in claim 12 wherein:
    (a) said output means has a centering means, and
    (b) said output means is responsive to two of said detent means and said centering means for generating said output signal proportional to said mid-valued signal between the other two signals.

16. A triple redundant control system comprising:
    (a) three actuators, each actuator having an actuating arm with detent means thereon,
    (b) three separate signal generators, each of said signal generators being connected to an actuator for actuating its actuating arm in proportion to the value of its signal,
    (c) output means connected to said three actuator arms through said detent means for generating an output signal, and
    (d) said output means being responsive to said three detent means for generating an output signal proportional to the signal of said three signals having a mid-value between the other two signals.

17. A triple redundant control system as recited in claim 16 wherein:
  (a) said output means has a centering means, and
  (b) said output means is responsive to three of said detent means and said centering means for generating said output signal proportional to said mid-valued signal between the three signals.

18. A redundant control system as recited in claim 16 wherein:
  (a) said output means has a centering means, and
  (b) said output means is responsive to two of said detent means and said centering means for generating said output signal proportional to said mid-valued signal between the other two signals.

References Cited

UNITED STATES PATENTS

| | | | |
|---|---|---|---|
| 3,095,783 | 7/1963 | Flindt | 91—1 |
| 3,198,082 | 8/1965 | Kerris | 91—1 |
| 3,257,911 | 6/1966 | Garnjost | 91—1 |
| 3,411,410 | 11/1968 | Westbury et al. | 91—1 |

FOREIGN PATENTS

| | | | |
|---|---|---|---|
| 1,012,727 | 12/1965 | Great Britain | 244—75 |
| 1,151,737 | 5/1969 | Great Britain | 244—75 |
| 1,208,002 | 9/1959 | France | 244—75 |

EDGAR W. GEOGHEGAN, Primary Examiner

U.S. Cl. X.R.

91—411B, 412; 244—75R